US008209170B2

(12) United States Patent
Orcutt

(10) Patent No.: US 8,209,170 B2
(45) Date of Patent: *Jun. 26, 2012

(54) VOICED PROGRAMMING SYSTEM AND METHOD

(75) Inventor: Lunis Orcutt, Hermitage, TN (US)

(73) Assignee: Lunis ORCUTT, Bethpage, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/152,034

(22) Filed: Jun. 2, 2011

(65) Prior Publication Data

US 2011/0257970 A1    Oct. 20, 2011

Related U.S. Application Data

(63) Continuation of application No. 11/425,213, filed on Jun. 20, 2006, now Pat. No. 7,966,182.

(51) Int. Cl.
*G10L 15/16* (2006.01)
(52) U.S. Cl. ........ 704/232; 704/231; 704/246; 704/247; 704/251; 704/252

(58) Field of Classification Search .................. 704/232, 704/246, 247, 251, 252
See application file for complete search history.

(56) References Cited

U.S. PATENT DOCUMENTS

| | | | | |
|---|---|---|---|---|
| 5,564,050 A * | 10/1996 | Barber et al. | ......................... | 1/1 |
| 6,173,441 B1 * | 1/2001 | Klein | ............................. | 717/142 |
| 6,351,693 B1 * | 2/2002 | Monie et al. | .................. | 700/299 |
| 6,356,867 B1 * | 3/2002 | Gabai et al. | ................... | 704/270 |
| 2003/0110040 A1 * | 6/2003 | Holland et al. | ............... | 704/275 |
| 2003/0192032 A1 * | 10/2003 | Andrade et al. | .............. | 717/124 |
| 2005/0289522 A1 * | 12/2005 | Chang et al. | .................. | 717/140 |

* cited by examiner

*Primary Examiner* — Leonard Saint Cyr
(74) *Attorney, Agent, or Firm* — Adam L. K. Philipp; Aeon Law

(57) ABSTRACT

Provided herein are systems and methods for using context-sensitive speech recognition logic in a computer to create a software program, including context-aware voice entry of instructions that make up a software program, automatic context-sensitive instruction formatting, and automatic context-sensitive insertion-point positioning.

5 Claims, 8 Drawing Sheets

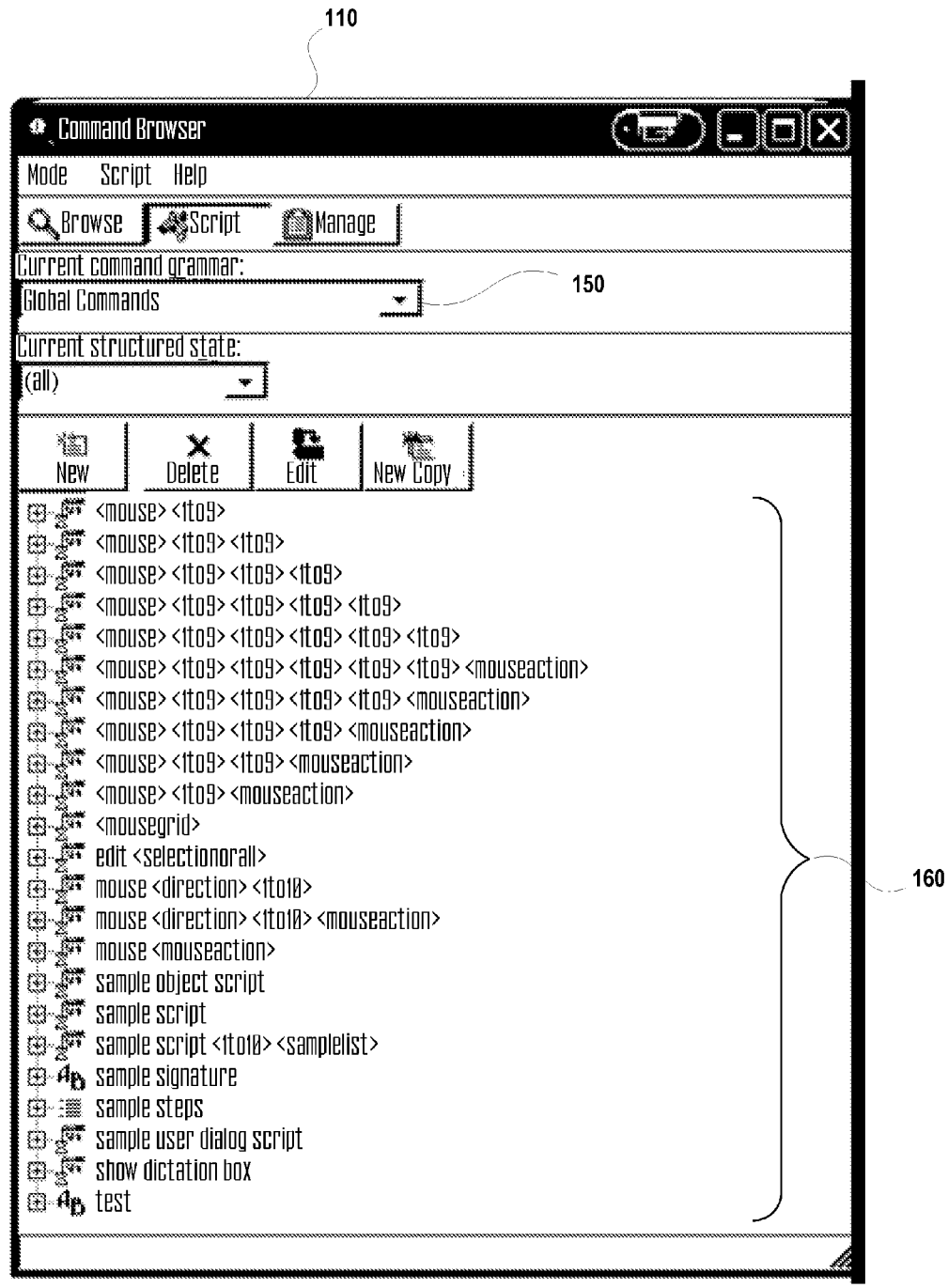
Fig.1 (continued) (Prior Art)

VOICED PROGRAMMING SYSTEM AND METHOD

CROSS-REFERENCE TO RELATED APPLICATION

The present application is a continuation application of U.S. patent application Ser. No. 11/425,213, "VOICED PROGRAMMING SYSTEM AND METHOD," naming Lunis Orcutt as the inventor, filed Jun. 20, 2006; the present application claims the benefits of priority under 35 USC §120 to the above-listed application, the entirety of which is hereby incorporated by reference.

FIELD

The present invention generally relates to computer programming and, more particularly, to a voiced programming system and method.

BACKGROUND

Computer programming has been accomplished in a variety of fashions since the development of computers and computer software. Early programming techniques involved physical manipulation of computing architecture (e.g., tube and transistors). However, as data storage media became more advanced, it became possible to re-use one program for many things according to the content of the memory. A person would spend quite some time making punch cards that would hold a list of instructions for a computer. Every model of computer would be likely to need different instructions to do the same task. As computers became more powerful, and storage media became re-usable, it became possible to use the computer to make the program. Programmers quickly began to favor text over is and Os, and punch cards were phased out. Over time and especially thanks to the manufacture and the development of integrated circuits, computers have become extremely powerful, and this has resulted in a branch of programming called scripting. Programming has become gradually easier as new languages are developed. Even to the point where lay people have been able to create their own scripts and/or macros.

Macros are generally an abstraction, whereby a certain textual pattern is replaced according to a defined set of rules. An interpreter or compiler automatically replaces the pattern when it is encountered. The term macro is used in many similar contexts which are derived from the concept of macro-expansion, including keyboard macros and macro languages. In most situations, the use of the word "macro" implies expanding a small command or action into a larger set of instructions.

Along with programming, speech recognition has developed concurrently with the development of computing systems. Speech recognition (in many contexts, also known as automatic speech recognition, computer speech recognition or voice recognition) technologies generally represent a set of technology that allows computers equipped with a source of sound input, such as a microphone, to transform human speech to a sequence of words. Applications of speech recognition include transcription and as an alternative method of interacting with a computer.

Some speech recognition systems allow for macros to be programmed and then activated by a voice command. FIG. 1 illustrates a prior art macro environment for the programming of macros that will be voice activated. Included in FIG. 1 are a command browser 110 having a list of commands 160 conforming to a command type 150. In the example command browser 110, the listed commands 160 are all global commands. The command browser also includes a button for creating a new command 155. The new command button activates a command editor 115 where a new command may be entered. The new command editor 115 includes text input fields for a command name 120 and description 125. Also included in the command editor 115 is a button to train 130 a command name for voice activation in a speech recognition system (not shown). The command editor 115 also includes command type selection 135 with the "global" type shown as being selected. An additional command type is shown in selection box 140 indicating that it is text and graphics type of command. In the command work space 145 a user may type in the programming instructions for the new command. Also shown in FIG. 1 is a voice recognition tool bar 105 shown attached to the command editor 115. The voice recognition tool bar 105 is used to control voice recognition activity in a currently active application in a computing system.

While the above-described command editing environment does allow a user to create (and edit) new commands for use in a voice recognition system, it is not designed for voice entry of the instructions that make up a macro and/or program activated by a command.

While voice recognition systems are designed to assist those for whom typing is not a preferred entry method, paradoxically the most avid users of those are most likely to desire and develop customized voice commands. Simple instructions such as adding a new word or a shortcut for a block of text are easy to use and program in conventional systems such as those shown in FIG. 1. However, programming instructions with all their complex syntax is cumbersome when each element has to be dictated, sometimes character by character. For example, FIG. 1 has a command browser 110 and a command editor 115, but the programming environment is optimized for typed input, not for voice input. For example dictating the following program named "PrintDoc":

SendKeys ({Ctrl+p})
Wait 500
ControlPick "okay"

Would require approximately 3 minutes to enter a name for the program including proper capitalizations and then move the text down and enter the information in its proper order sometimes character by character and including a probable correction of the term "Wait 500" which would probably be spelled weight instead of wait.

DETAILED DESCRIPTION

Figure 1:
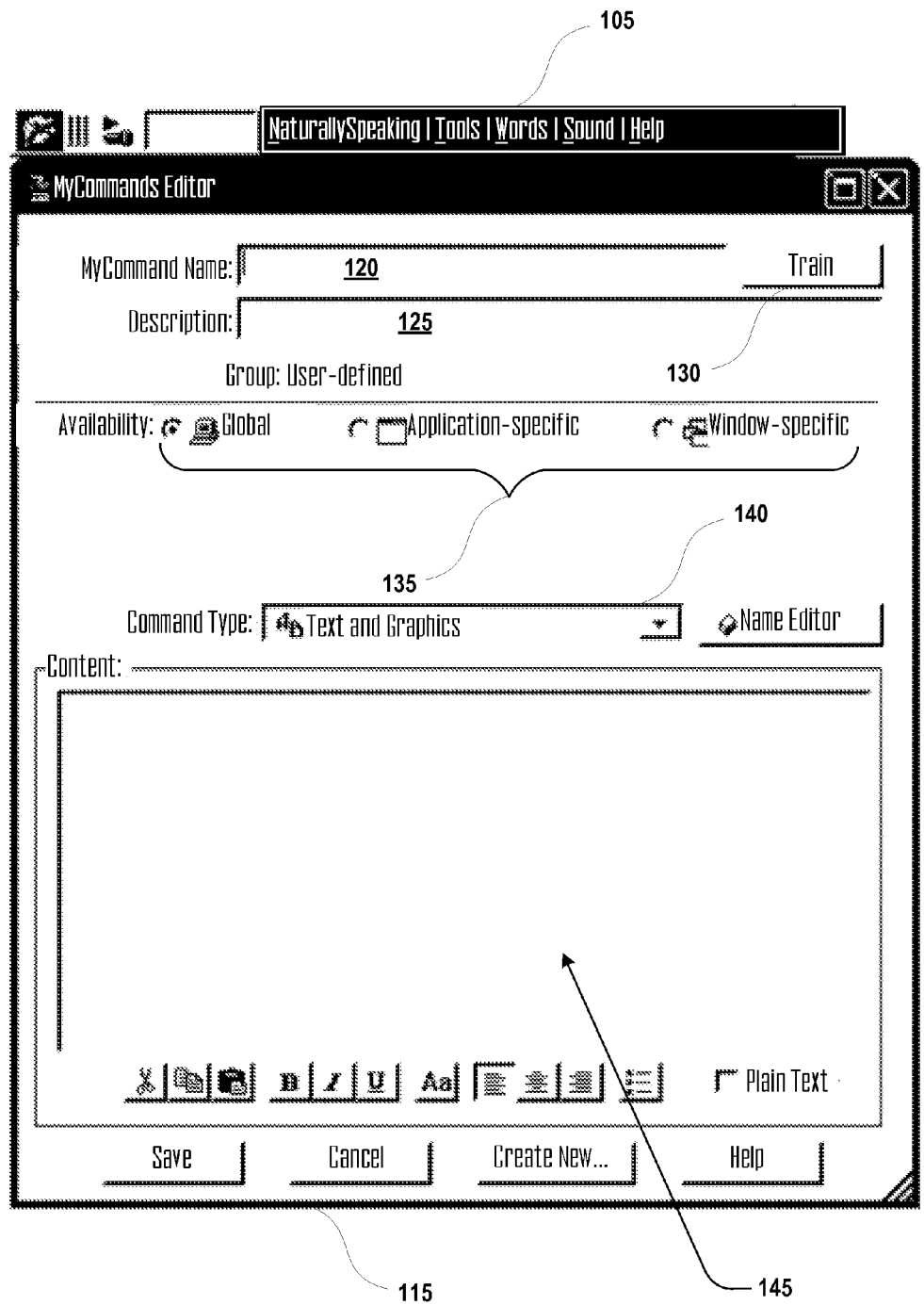
FIG. 1 is pictorial diagram of a prior art voice command programming interface.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers and memory storage devices. Each of these conventional distributed computing components is accessible by the processor via a communication network.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. Those of ordinary skill in the art will appreciate that other embodiments, including additional devices, or combinations of illustrated devices, may be added to, or combined, without limiting the scope to the embodiments disclosed herein.

Figure 2:
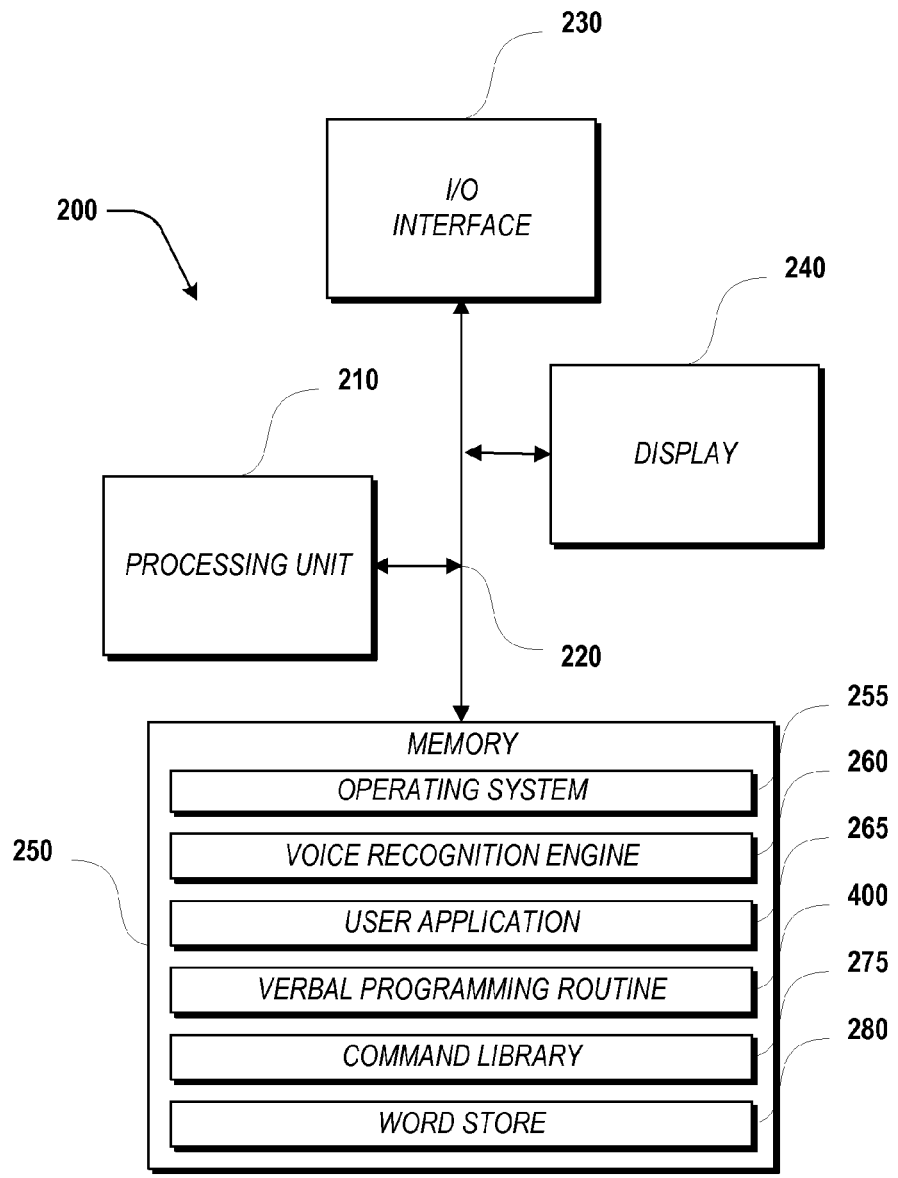
FIG. 2 is a block diagram of a user device that provides an exemplary operating environment for one embodiment.

FIG. 2 illustrates several of the components of the user device 200. In some embodiments, the user device 200 may include many more components than those shown in FIG. 2. However, it is not necessary that all of these generally conventional components be shown in order to disclose an illustrative embodiment. As shown in FIG. 2, the user device 200 includes a input/output interface 230 for connecting to other devices (not shown). In various embodiments, the input/output interface 230 includes the necessary circuitry for such a connection and is constructed for use with the appropriate protocol.

The user device 200 also includes a processing unit 210, a memory 250 and may include a display 240, all interconnected along with the network interface 230 via a bus 220. The memory 250 generally comprises a random access memory ("RAM"), a read only memory ("ROM"), and a permanent mass storage device, such as a disk drive. The memory 250 stores the program code necessary for a voice recognition engine 260, a user application 265, a verbal programming routine 400, a command library 275 and a word store 280. In addition, the memory 250 also stores an operating system 255. It will be appreciated that these software components may be loaded from a computer readable medium into memory 250 of the user device 200 using a drive mechanism (not shown) associated with a computer readable medium, such as a floppy disc, tape, DVD/CD-ROM drive or via the network interface 230.

Although an exemplary user device 200 has been described that generally conforms to a conventional general purpose computing device, those of ordinary skill in the art will appreciate that a user device 200 may be any of a great number of devices capable of processing speech and storing commands.

Figure 3:
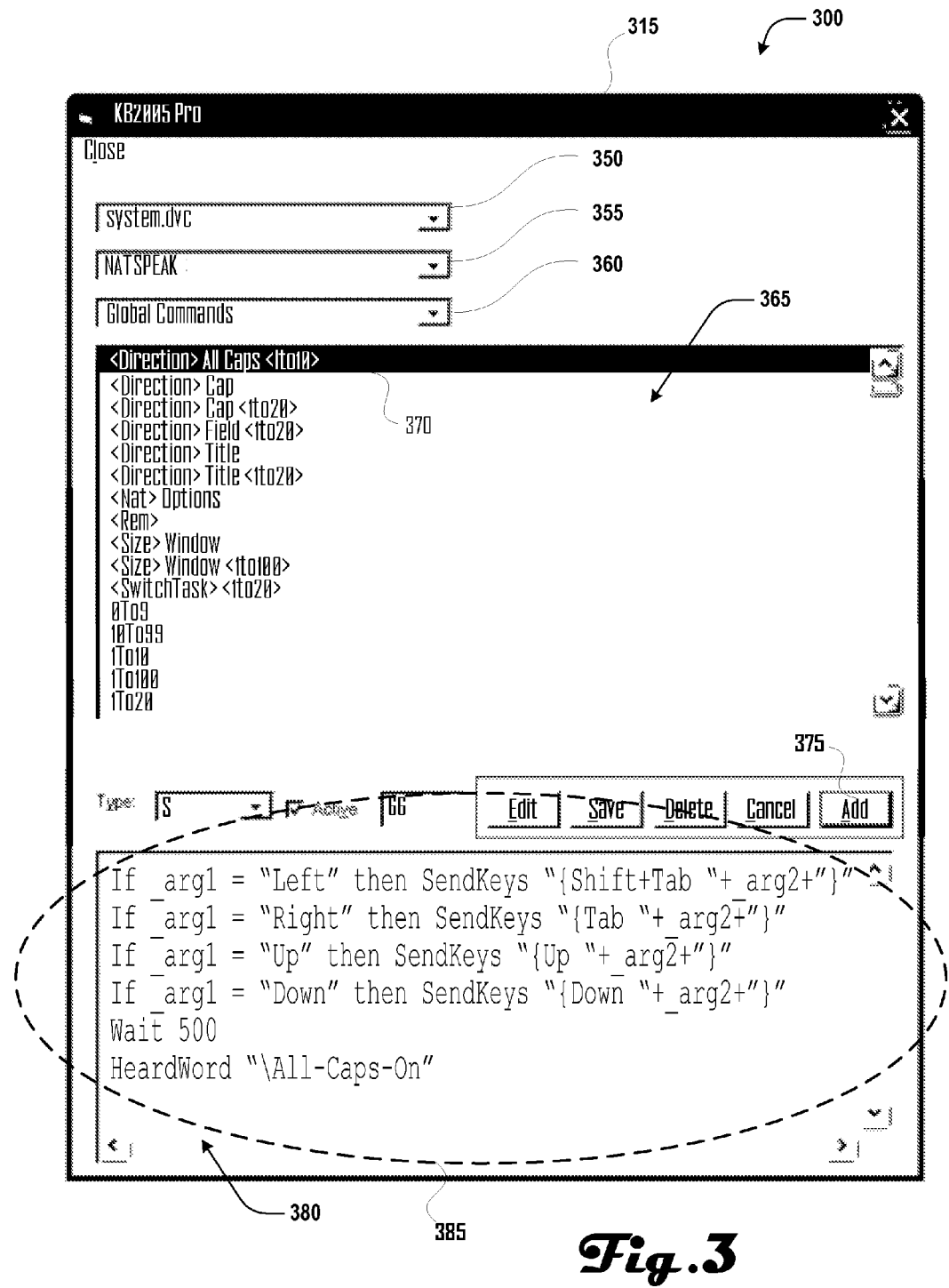
FIG. 3 is pictorial diagram of a voiced programming interface in accordance with various embodiments.
Figure 3:
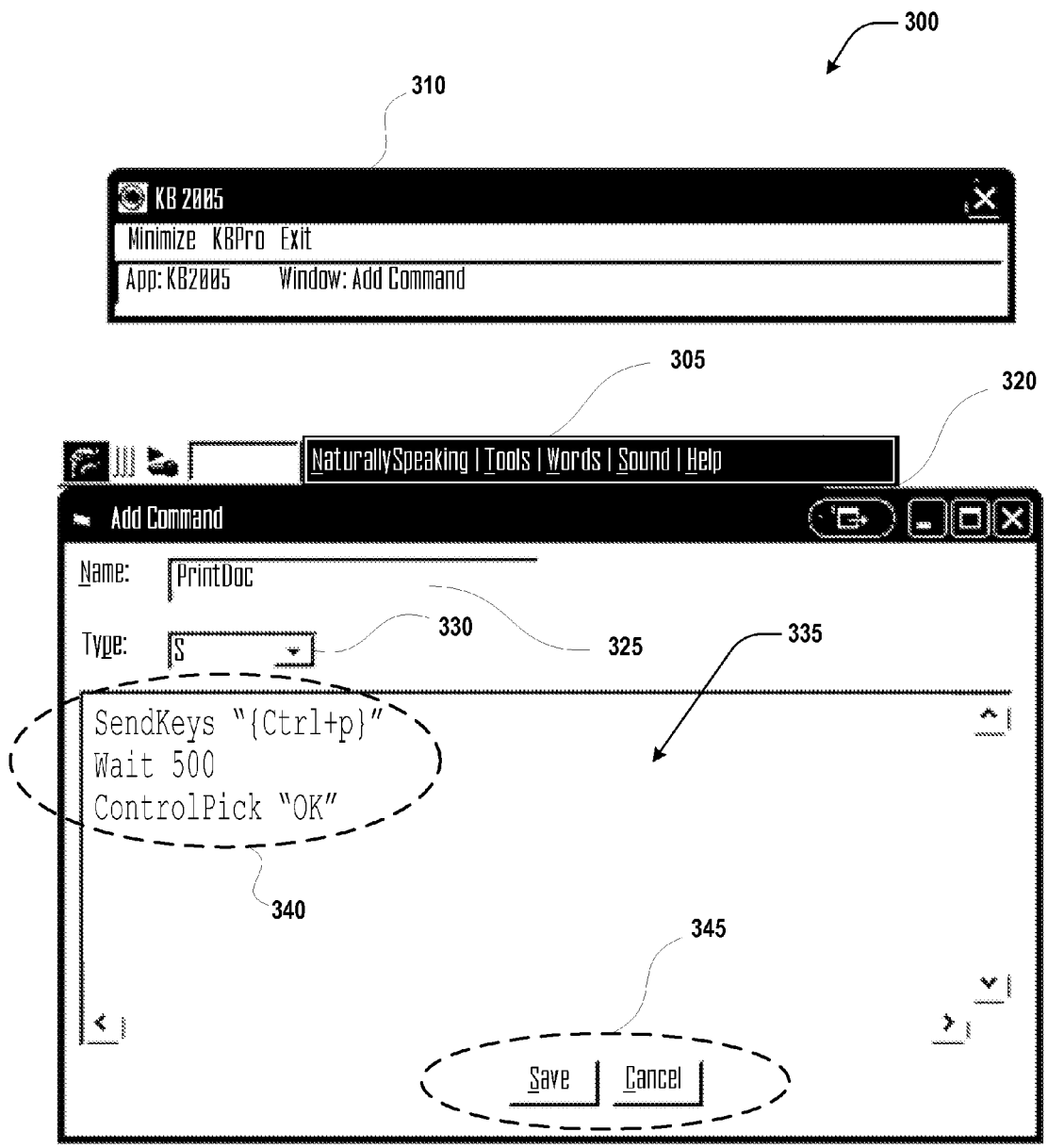

FIG. 3 illustrates an example voiced program development environment 300 that includes a voiced programming application window 310, a command listing window 315 and an "add command" window 320. The command listing window 315 includes a number of commands listed according to command characteristics. Selection box 350 illustrates that the current commands are those applying to the system (and not a specific application 265), which in one exemplary implementation are system-wide commands. Next, the speech engine selection box 355 indicates the relevant speech recognition engine employed for processing the commands and the command type selection box 360 includes global commands (e.g., not specific to a particular purpose within an application, such specific commands may be useful when dealing with particular dialogs and/or menus within an application) as the current type of commands in use.

In the command list 365 a current command "<Direction> All Caps <1to20>" 370 is selected which includes the associated instructions 385 for the selected command 370. The command instructions 385 are shown in a command work space 380. Among the possible actions shown for a command is an add command button 375. The add command button 375, when selected, brings up the add command window 320.

Shown in add command window 320 is an example new command "PrintDoc" as shown in the command title box 325. The PrintDoc command is of the type "S" as shown in the type selection box which indicates that this is a new global command and the command instructions 340 have been entered in the command work space 335. Note that the add command window 320 has the speech recognition tool bar 305 attached to it in the sample screenshot as it is currently operating with a speech recognition system that attaches a speech recognition tool bar 305 to a currently active window. Also in the add command window 320 are user interfaces 345 for saving and/or canceling the addition of a new command.

Missing from conventional typed program creation is an easy way to dictate scripts and/or program instructions. Provided by various embodiments described herein, is a script/program development environment that is optimized for spoken input. Unlike conventional speech, which usually consists of linear sequences of words and punctuation, scripts and programs generally will be composed of structured methods of instructions and parameters separated by delimiters. Therefore, in various embodiments, when dictating a program instructions it is possible to anticipate the structure of the program given the structure of known programming instructions.

Program instructions may be treated as atomic and configured to be used within a voiced program development environment. However, each instruction may be composed of further instructions. In other words, any instruction may itself be a program. However, based on the program development environment context, speaking an instruction name may either execute that instruction, open an editing environment for editing the instruction, or insert the instruction into an existing editing session.

For example, speaking the instruction "PrintDoc" in an executable environment execute the command (e.g., would print the current printable object, such as a document, spreadsheet, image, calendar, etc.). In other environments, e.g., speaking "edit global command PrintDoc" would open up the command "PrintDoc" in the development interface. Alternately, if a user was already in an editing environment, speaking "PrintDoc" might insert a "PrintDoc" command in the program development environment.

In some environments, there are formatting conventions that are not necessarily part of the syntax of the programming language, but are useful to developers when reading the program. For example, carriage returns between instructions, tabbed/indented and/or nested levels of a program, Capitalization of instructions, variables and/or other programming objects. For example the command "PrintDoc" could be all lowercase, all uppercase, two words, title case, title case with concatenated words, and the like. Based on a context sensitive understanding of the current input environment, some embodiments will automatically format commands/instructions in a consistent (and possibly configurable) manner. Likewise, depending on the context, speech may be interpreted differently. In one embodiment, instructions with non-instruction homonyms would be given preference in a programming environment. For example, the words "wait" "weight" are homonyms. In a non-programming environment, "weight" may be a more common and therefore preferred speech to text conversion. However, in a programming environment "wait" may be given preference.

Figure 4:
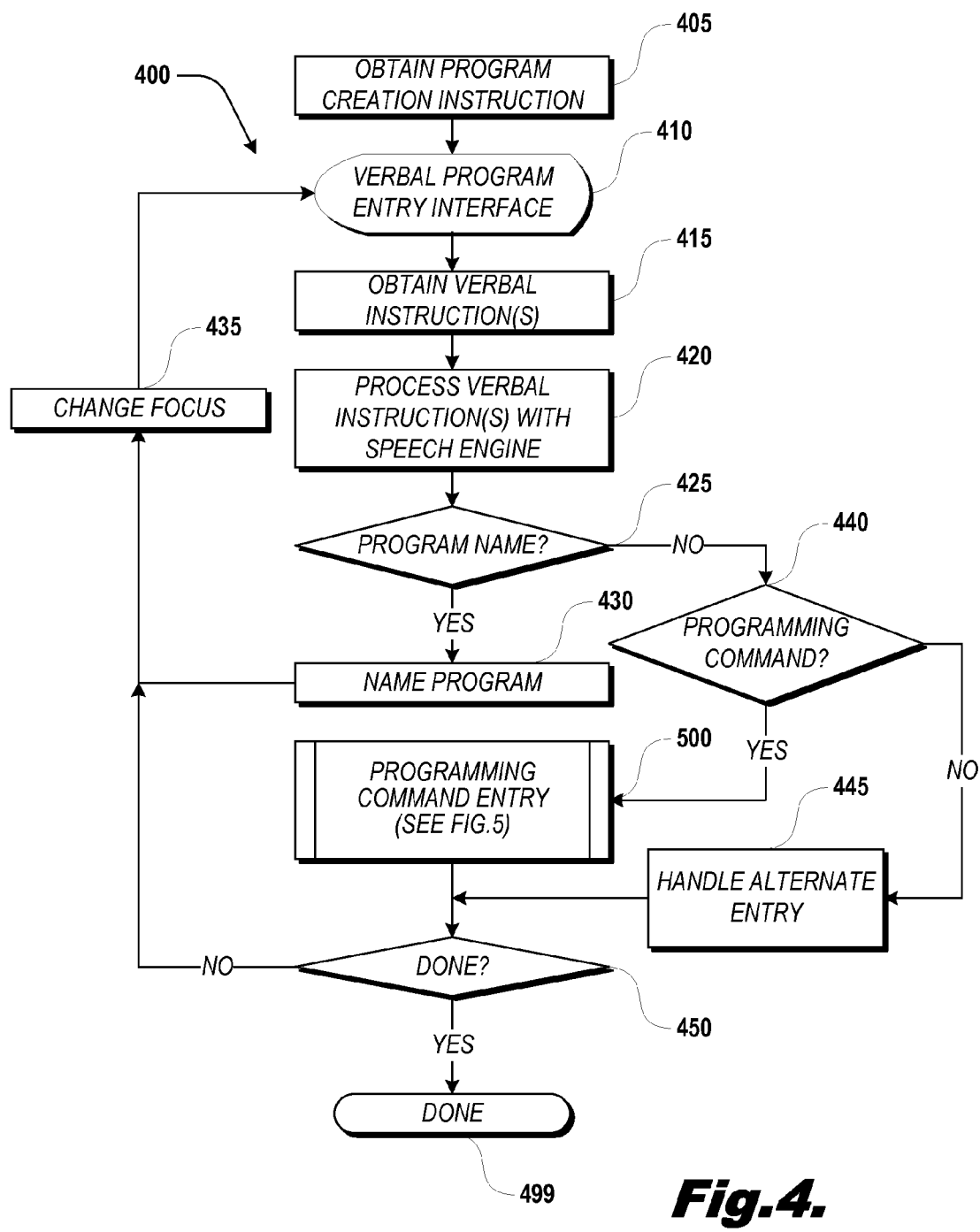
FIG. 4 is a flow diagram illustrating a program creation routine in accordance with one embodiment.

To better illustrate the creation of a voice command using spoken instructions, voiced programming routine 400 is illustrated in FIG. 4 and described below. Voiced programming routine 400 begins a block 405 where a program creation instruction is obtained. Next, in block 410, a voiced program entry interface is depicted (e.g., a voiced program entry interface such as the one shown in FIG. 3). In block 415 a voiced instruction or instructions are obtained. The speech recognition engine 260 processes the voiced instruction(s) and in decision block 425 a determination is made whether the obtained voiced instructions are a program name. If so, in block 430, a new name is given to the program and processing continues to block 435. In block 435 the focus of a voiced program entry interface is changed (e.g., from a name field to a subsequent field and/or program instruction work space) processing then cycles back to block 410.

Figure 5:
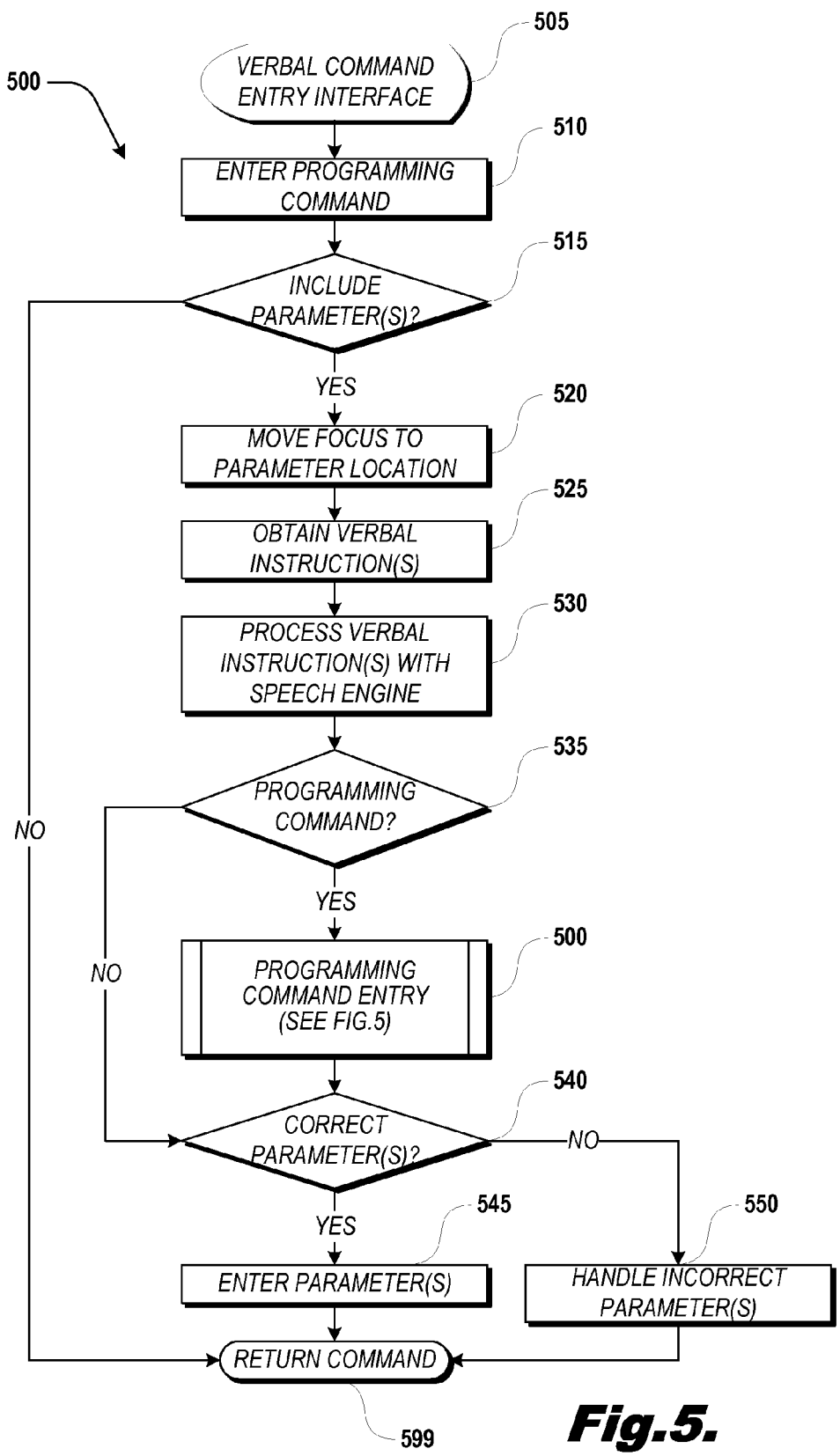
FIG. 5 is a flow diagram illustrating a command entry subroutine in accordance with one embodiment.

If however, in decision block 425 it was determined that the voiced instruction(s) was not a program name, processing continues to decision block 440 where determination is made whether the voiced instruction(s) was a programming command. If so processing continues to programming command entry subroutine 500 (illustrated in FIG. 5 and described below). Upon returning from programming command entry subroutine 500, processing proceeds to block 450.

If in decision block 440 was determined that the voiced instruction(s) was not a programming command, processing proceeds to block 445 where an alternate entry is handled (such alternate entries might be specifying a program type, or other information about a program). Processing continues onto decision block 450 where determination is made whether the program creation is done. If not, processing cycles back to decision block 435 where the focus is changed.

In various embodiments, the add command interface 320 is a context sensitive interface, as voiced instruction(s) are added, the change in focus is handled in an intelligent fashion. For example given the command "sendkeys", the command sendkeys would be entered followed by a matched set of quotation marks (i.e., sendkeys ""). The change in focus would expect that a parameter would be entered in between the quotation marks. Accordingly, the changed focus in block 435 would be to automatically relocate an entry marker (e.g., a cursor or the like) in between the quotation marks, or wherever it would be programmatically correct to next enter information. In alternate embodiments, the proper delimiters may be automatically added after voiced commands have been received.

If in decision block 450 it was determined that the program creation instructions are done, processing proceeds to block 499 where a program creation routine 400 ends.

As mentioned above, FIG. 5 illustrates an exemplary programming instruction entry subroutine 500. Programming instruction entry subroutine 500 begins with block 505 where a programming instruction is obtained. In block 510, the programming instruction is entered into a command work space. Next in decision block 515 a determination is made whether the entered programming instruction includes one or more parameters. If so, processing proceeds to block 520 where the focus for the entry of information is moved to the parameter entry location. In block 525 voiced instruction(s) are obtained. In block 530, the voiced instruction(s) are processed with the speech recognition engine 260. Next, in decision block 535 a determination is made whether the voiced instruction(s) is a programming command. If so, processing recursively calls programming instruction entry subroutine 500. If however in decision block 535 it is determined that the voiced instruction(s) is not a programming command, processing proceeds to decision block 540 where determination is made whether the voiced instruction(s) included correct parameter(s). If so, processing proceeds to block 545 where the parameter(s) is entered. Processing then proceeds to decision block 599. If however in decision block 540 it was determined that parameters were incorrect, processing proceeds to block 550 where incorrect parameters are handled (e.g., by notifying a user, or otherwise indicating that the parameters are incorrect). Processing then proceeds to decision block 599 where the instruction (and any parameters) are returned to the calling routine.

Figure 6:
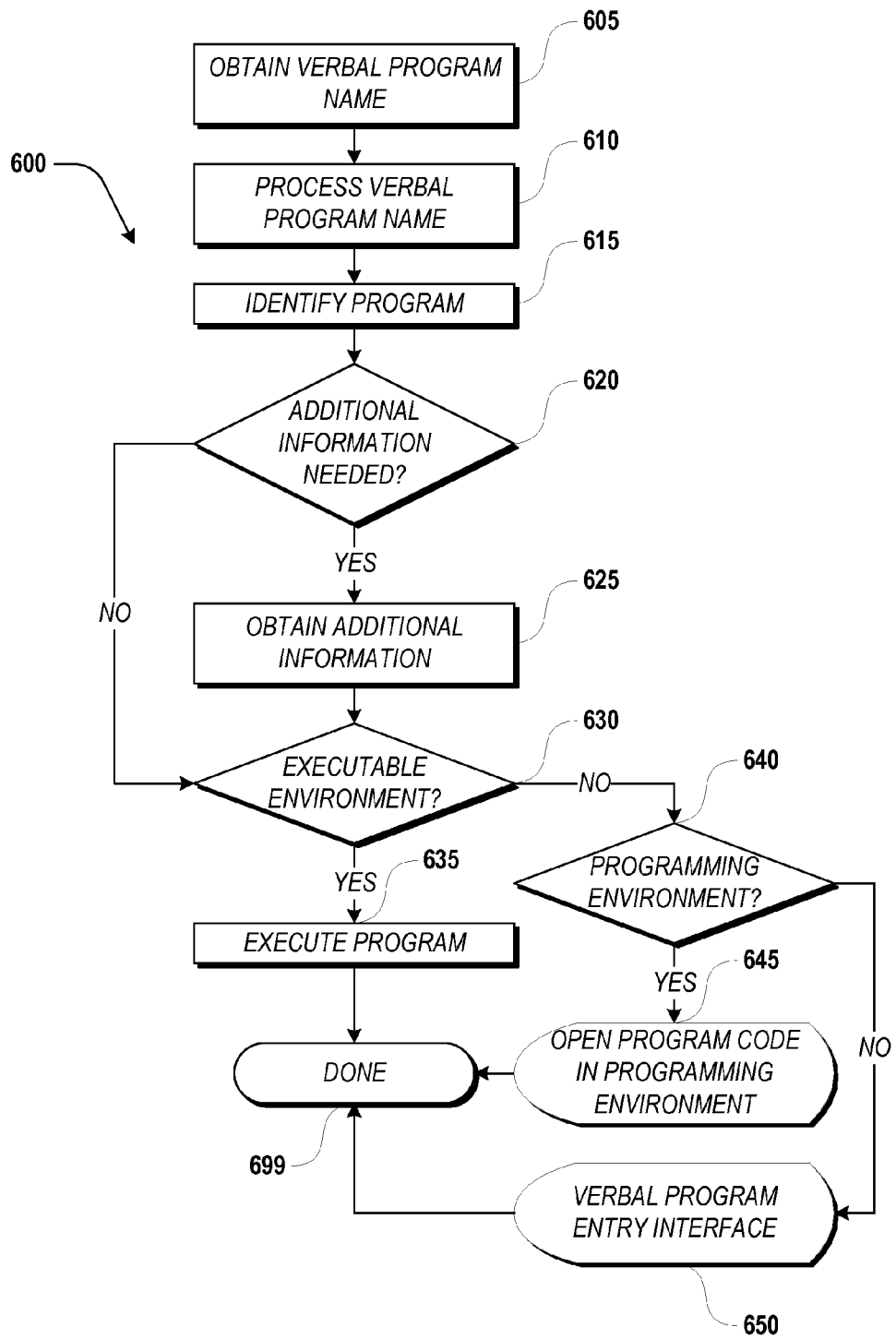
FIG. 6 is a flow diagram illustrating a program handling routine in accordance with one embodiment.

In addition to programming commands, various embodiments provide an integrated environment for handling voiced commands. While the above description relates to the creation of new programs using voiced instructions, FIG. 6 relates to the overall interaction with commands in a voiced programming system. In particular, the voiced program handling routine 600 begins a block 605 where a voiced program name is obtained. In block 610 the voiced program name is processed (e.g., with the speech recognition engine 260) and in block 615, the program is identified. In decision block 620 a determination is made of whether additional information is needed for the identified program (e.g., if a program requires certain parameters and the like). If so, processing continues to block 625, otherwise processing proceeds directly to decision block 630. In any case once additional information is obtained in block 625 processing proceeds to decision block 630 where determination is made whether the current environment is an executable environment for the identified program. If so, processing proceeds to block 635 where the program is executed. Next, in block 699, the routine 600 ends. If in decision block 630 it was determined that the current environment is not an executable environment, processing proceeds to block 640 where determination is made whether the current environment is a programming environment. If so, processing proceeds to block 645 where a programming code associated with the identified program is open for editing and/or programming in an editable environment. Processing then proceeds to block 699. If in decision block 640 it was determination the current environment is not a programming environment, processing proceeds to the voiced program entry interface as shown in block 650. Next, processing proceeds to block 699, where program handling routine 600 ends.

Although specific embodiments have been illustrated and described herein, it will be appreciated by those of ordinary skill in the art that a wide variety of alternate and/or equivalent implementations may be substituted for the specific embodiments shown and described without departing from the scope of the present invention. This application is intended to cover any adaptations or variations of the embodiments discussed herein. Therefore, it is manifestly intended that this invention be limited only by the claims and the equivalents thereof.

The invention claimed is:

1. A computer-implemented method of creating, utilizing speech recognition logic, a software program, the method comprising:

obtaining, by a computer, an instruction to create the software program;

depicting, by the computer, a source code entry user interface including an instruction-entry workspace;

automatically focusing, by the computer, an entry marker to a first position in said instruction-entry workspace for entry of a subsequently-spoken instruction;

obtaining, by the computer utilizing the speech recognition logic, said subsequently-spoken instruction;

determining, by the computer, that said subsequently-spoken instruction corresponds to a programming instruction that syntactically requires at least one delimited parameter;

automatically inserting, by the computer, said programming instruction and a matched set of delimiters at said first position; and automatically re-focusing, by the computer, said entry marker to a second position between said matched set of delimiters in said instruction-entry workspace for entry of at least one subsequently-spoken parameter.

2. The method of claim 1, further comprising:

obtaining, utilizing the speech recognition logic, said at least one subsequently-spoken parameter; and automatically inserting, by the computer, said at least one subsequently-spoken parameter at said second position between said matched set of delimiters, such that said programming instruction, said matched set of delimiters, and said at least one subsequently-spoken parameter forming a syntactically-valid programming instruction.

3. The method of claim 1, further comprising:

obtaining, by the computer utilizing the speech recognition logic, a command name for invoking the software program; and associating, by the computer, said generated software program with said command name, such that said command name, when recognized by said speech recognition logic, invokes said generated software program.

4. A non-transitory computer-readable storage medium containing computer executable instructions that, when executed by a processor, perform the method claim 1.

5. A computing apparatus comprising a processor and a memory containing computer executable instructions that, when executed by the processor, perform the method of claim 1.

* * * * *